3,171,815
METHOD FOR PREPARATION OF THORIUM DICARBIDE AND THORIUM-URANIUM DICARBIDE PARTICLES
James L. Kelly and Orlen C. Dean, Oak Ridge, and Don E. Ferguson, Knoxville, Tenn., assignors to the United States of America as represented by the United States Atomic Energy Commission
No Drawing. Filed May 22, 1963, Ser. No. 282,517
11 Claims. (Cl. 252—301.1)

Our invention relates to fuel and fertile materials for nuclear reactors and more particularly to a method of preparing thorium dicarbide and thorium-uranium dicarbide articles for graphite-matrix fuel elements.

Thorium-dicarbide, $ThC_2$, and combined thorium-uranium dicarbide, $(Th-U)C_2$, in the form of dispersed particles in a graphite matrix are useful as fertile and fuel materials for gas-cooled, power-breeder nuclear reactors. Reactors of this type are exemplified by the High Temperature Gas-Cooled Reactor, a helium-cooled, graphite-moderated experimental reactor wherein the high temperature potential of gas cooling is combined with a fuel capable of high burnup. The fuel elements for this reactor comprise ring-type graphite compacts containing dispersed thorium-uranium dicarbide at a proportion of 1 atom uranium-235 to 10 atoms thorium to 700 atoms carbon. Fabrication of fuel compacts is effected by pyrolytically coating thorium-uranium dicarbide particles with a 20 to 50 micron layer of carbon, mixing the coated particles with a suitable binder and finely divided graphite, and forming the mixture into compacts by warm-pressing and sintering methods. The particle size of the thorium-uranium dicarbide is critical to attainment of the desired fuel-compact performance. Piston product release from the particles increases drastically with decreasing particle size and serves to establish a minimum size limit of about 100 microns in diameter. Larger particles are also critical to achievement of the desired fuel loading since greater volumes of coating material are required for finer particles. In general, particles with spherical or near spherical shape and a size from about 100 to 250 microns in diameter are desired for this type of fuel compact, and a particle size of about 200 microns is employed for the particular reactor application mentioned above. Other types of carbide-containing fuel elements may require smaller or larger particles.

Serious difficulties have arisen in the preparation of thorium and thorium-uranium dicarbide particles of the desired size and shape. These carbides are prepared by reacting the metal or hydride or oxide of the metal with carbon at an elevated temperature. The carbide-forming reactions depend on diffusion mechanisms, and either very finely divided reactants or excessively high temperatures, e.g., 2100° C., have been required. To avoid these temperatures, finely divided materials have normally been employed, and a finely divided carbide product has resulted. Sizing and shaping of the finely divided carbide has required a sequence of steps such as pelletizing by pressing in combination with a binder, sintering, crushing, and screening to size. Since the carbide, particularly in a finely divided state, reacts with air or moisture, these operations have required an inert atmosphere and have proven cumbersome. In addition, a large proportion of fines which require recycling have been produced. Sizing and shaping have also been effected by arc-melting the carbide, but this method has also been troublesome owing to the high temperatures required. Another problem presented in these methods is the extreme hardness of carbides and the resulting difficulty of grinding or shaping.

It is, therefore, an object of our invention to provide a method of preparing thorium dicarbide and thorium-uranium dicarbide particles.

Another object is to provide a method of preparing said particles with a spherical shape and a controlled particle size.

Another object is to provide a method of preparing said particles wherein sizing and shaping are effected prior to conversion to carbide.

Another object is to provide a method of preparing said particles at relatively low temperatures.

Other objects and advantages of our invention will be apparent from the following detailed description and claims appended hereto.

In accordance with our invention thorium dicarbide particles are prepared by mixing a nitrate-containing thorium oxide sol having a nitrate-to-thorium molar ratio of about .05 to .15 with finely divided carbon at a carbon-to-thorium molar ratio of at least 4 to 1, converting the resulting mixture to solid particles of a predetermined size and shape and firing the resulting particles in an inert atmosphere at a temperature of at least 1400° C. The same process is employed for thorium-uranium dicarbide except that up to 10 atom percent uranium values with respect to the total metal values are dispersed in the thorium oxide sol. In this process sizing and shaping of particles are carried out before conversion to carbide and while the particles are in a chemical form not sensitive to air or moisture. Handling of finely divided carbides in sizing and shaping operations is avoided. In contrast to previous methods, carbide particles of the desired size are prepared at relatively low temperature. This process is simple and amenable to operation on a large scale or under remotely controlled conditions, where required by radiation of thorium daughter isotopes in reprocessing irradiated material.

We have found that use of a carbon-containing thoria sol as the reaction mixture for the preparation of thorium dicarbide allows a controlled transition from the liquid to the solid state, and this transition provides a simple but highly flexible means of sizing and shaping the resulting particles. By varying conditions in converting the sol mixture to solid form, particles of a given size within a wide range may be prepared. In addition, the use of this system provides uniform distribution of uranium where a thorium-uranium dicarbide product is desired.

A thorium oxide sol suitable for the process of our invention may be prepared by dispersion of finely divided thorium oxide in an aqueous nitrate system. A nitrate ion concentration of at least $10^{-3}$ to $10^{-4}$ molar and a nitrate-to-thorium molar ratio of about .05 to .15 are critical to attainment of a stable sol. Where a uranium-containing product is desired a portion of the nitrate may be supplied by providing uranium in the form of uranyl nitrate in the system. The optimum amount of nitrate within the specified range depends on the particle size of the thoria, larger amounts being required for smaller particles since the nitrate interacts with the surface of the thoria. The thorium oxide may be supplied in any concentration up to 5 molar, but about 2 molar is preferred. Formation of a sol is preferably effected by adjusting the nitrate, thorium oxide and, if present, uranium concentrations; adjusting the pH to a value of about 3.5 to 4.0 by addition of ammonium hydroxide; and digestion of the resulting mixture at a temperature of 80° C. to 100° C. Digestion for a period of about 1 hour is normally required. The resulting sol contains colloidal thorium oxide particles having a mean diameter of 20 to 350 angstroms, the particles probably consisting mostly of single crystallites of thorium oxide with the uranium, if present, adsorbed thereon.

Our invention is not limited to a particular method of preparing the thorium oxide for incorporation in the sol, and any method which produces thorium oxide of sufficient dispersibility for sol formation may be employed. It is preferred, however, to prepare the thorium oxide by steam denitration of thorium nitrate at a temperature not exceeding about 475° C. Upon being contacted with superheated steam, hydrated thorium nitrate is converted to a molten dihydrate at a temperature of about 180° C. The temperature is then increased to 475° C. over a period of at least about 4 hours and maintained at this temperature for about 1 hour. The product is a highly dispersible, crystalline oxide containing less than 1 weight percent nitrate. Other methods which may be employed include thermal denitration of thorium nitrate in air at a temperature not exceeding 475° C., calcination of thorium oxalate at a temperature not exceeding 1000° C. and precipitation of hydrous thorium hydroxide from a thorium nitrate solution with ammonium hydroxide. Steam denitration as described above is preferred because of its easier control and adaptibility to large-scale operation.

Finely divided carbon is combined with the thorium oxide sol to produce a carbon-to-thorium molar ratio of at least 4 to 1, the stoichiometric ratio for formation of thorium dicarbide. A slight excess of carbon, e.g., 0.03 mole per mole thorium oxide, is preferred to provide for reduction of volatile material in the gel and to ensure complete conversion to the dicarbide. The term, "finely divided carbon," as used herein is intended to refer to carbon having a surface area of at least 600 square meters per gram and a mean particle size not exceeding about 350 angstroms. It is preferred to use carbon particles of about the same size as the dispersed thoria in the sol, for example, about 70 angstroms mean diameter for steam-denitrated thoria. The material prepared by combustion of hydrocarbons and available commercially under the designation, "furnace black," is particularly suitable in this regard. The finely divided carbon may also be provided from other carbon-containing materials which decompose to free reactive carbon.

In an alternative embodiment finely divided carbon is mixed with hydrous thorium oxide prior to forming a sol by adding the carbon at an intermediate stage in the precipitation of the hydrous thorium oxide. An initial precipitation is effected by gradual addition of an aqueous ammonium hydroxide solution to an agitated thorium nitrate solution until a haze of precipitate forms. Preferred conditions in this step are a temperature of about 90° C. to 100° C., an ammonium hydroxide concentration of 3 to 6 molar and a thorium nitrate concentration of 0.1 to 1.0 molar. The haze-containing mixture is digested for a period of at least 10 minutes, and the finely divided carbon is added to the mixture. Precipitation is then completed by the addition of more ammonium hydroxide solution. The thorium oxide-carbon precipitate is recovered by filtering and washing, and the precipitate is incorporated in a sol by digestion in a nitrate system as described above for thorium oxide alone. A nitrate-to-thorium ratio of about .05 is preferred for this material.

The thorium oxide sol-carbon mixture is converted to solid form under controlled conditions to produce particles of the desired size. Formation of solid particles may be effected by methods wherein the mixture is first evaporated and dehydrated to produce a solid cake which is then comminuted or by methods wherein the particles are formed prior to or simultaneous with evaporation and dehydration.

In the former embodiment the mixture is heated and the water therein is evaporated until the resulting gel is sufficiently dried for sizing and shaping, and drying until all except about 5 to 10 weight percent of the residual volatile nitrate and water are removed is suitable for this purpose. Drying conditions are not critical, except that a temperature high enough to ignite the carbon is avoided. A temperature of about 90° C. to 130° C. is preferred. A period of about 12 to 24 hours is required for drying at 130° C., and longer times are required at lower temperatures. The resulting dried gel is then comminuted by conventional grinding or crushing to produce particles of the desired size. The dried gel cake breaks up easily, and no special handling or inert atmosphere is required. The desired size fraction may be obtained by screening. The method is suitable for preparing particles 100 to 250 microns in diameter for graphite matrix fuel compacts and may also be employed for larger or smaller particles by adjustment of comminution and screening conditions. The resulting particles may then be further shaped or rounded to near spherical form by conventional techniques such as tumbling. The fine material produced in this sequence of steps may be recycled by redispersing in dilute nitric acid to produce a thoria sol-carbon mixture and converting the mixture to particles in the same manner as the initial mixture.

Formation of solid thorium oxide-carbon particles prior to or simultaneous with removal of water from the mixture may be effected by several methods. In one method the mixture is dispersed in an organic liquid to produce congealed droplets. An organic drying agent is then added under controlled conditions to remove the water and produce gelled spherical particles. This method is particularly suitable for producing particles of a uniform size from about 50 to 400 microns in diameter. This method is the subject of a co-pending application, Serial No. 282,518, filed the same date as the present application, by A. T. Kleinsteuber and assigned to a common assignee. Another method which is suitable for formation of spherical solid particles comprises spray-drying the thorium oxide sol-carbon mixture by conventional techniques. Smaller particles, e.g., 1 to 30 microns in diameter, may be prepared by this method. Spherical particles may also be prepared by the use of a spinning rotary disc wherein sol droplets are fed to the center of a heated, rotating disc. As the droplets spiral outward due to rotation of the disc, they maintain spherical shape and dry to a stable gel. This method may be employed for the preparation of particles from 150 to 300 microns in diameter, although it is not limited to this size range.

The thorium oxide-carbon particles formed as described above are converted to thorium dicarbide by firing at a temperature of at least 1400° C., and normally 1450° C. to 1775° C., in an inert atmosphere. The preferred firing conditions are a temperature of about 1775° C. for one hour for both thorium dicarbide and thorium-uranium dicarbide. At lower temperatures longer firing times are required for complete conversion. The particles shrink about 30 volume percent during firing, and this shrinkage is taken into account in sizing the particles in the preceding particle-preparation steps.

The resulting particles consist of stoichiometric thorium dicarbide or, when uranium is present, a solid solution of thorium-uranium dicarbide, together with a small amount of free carbon. No monocarbide or other carbide phase is detectable in the particles. These particles are particularly suitable for pyrolytically coating with carbon and incorporation in a graphite matrix fuel element owing to the absence of other carbide phases.

Uranium may be incorporated in the thorium dicarbide at a proportion up to about 10 atom percent of the total metal. At higher proportions the uranium-containing sol is unstable. Uranium values may be provided in the sol as uranyl nitrate or as a dispersible oxide, i.e., hydrated $UO_3$, or precipitated ammonium diuranate. Uranyl nitrate is preferred since the sol is prepared in a nitrate system. The remaining steps of the process are the same as for thorium alone, except as noted above.

Our invention is further illustrated by the following specific examples.

Example I

A thorium oxide sol was prepared by dispersing 300 grams of thorium oxide obtained by steam denitration of thorium nitrate at a maximum temperature of 475° C. in a 0.15 molar nitric acid solution to produce a nitrate-to-thorium molar ratio of 0.1, adjusting the pH to 3.8 and digesting at 90° C. The final concentration of thorium was 2 molar. 81.2 grams of carbon in the form of "channel black" was then added and blended with the sol. The carbon had a surface area of 667 square meters per gram and a mean particle size of 9 millimicrons diameter. The resulting mixture was air-dried in an oven at 130° C. for 16 hours to produce a solid cake. The cake was crushed, screened and tumbled to produce particles 0.1 inch in diameter and approximately spherical in shape. A 15-gram sample of the particles was then fired at 1775° C. in argon for 6 hours. Analysis of the product revealed 99.8 percent conversion to thorium dicarbide with no monocarbide.

Example II

Thorium-uranium carbide particles were produced by the method of Example I, except that uranyl nitrate was provided in the sol at a proportion of 5 atom percent uranium with respect to total metal. Analysis of the product particles revealed 99.8 percent conversion to dicarbide with no monocarbide.

The above examples are merely illustrative and are not to be construed as limiting the scope of our invention, which is limited only as indicated by the appended claims.

Having thus described our invention, we claim:

1. The method of preparing thorium dicarbide particles which comprises mixing a thorium oxide sol containing nitrate ion at a nitrate-to-thorium molar ratio of about .05 to .15 with finely divided carbon at a carbon-to-thorium molar ratio of at least 4 to 1, evaporating the resulting mixture whereby a dried gel is formed, comminuting the resulting gel and firing the resulting particles at a temperature of at least 1400° C. in an inert atmosphere.

2. The method of claim 1 wherein uranium values are dispersed in said sol at a uranium proportion up to 10 atom percent of the total metal values therein.

3. The method of preparing thorium dicarbide particles which comprises mixing a thorium oxide sol containing nitrate ion at a nitrate-to-thorium molar ratio of about .05 to .15 with finely divided carbon at a carbon-to-thorium ratio of at least 4 to 1, dispensing droplets of the resulting mixture, drying said droplets whereby spherical solid particles are formed and firing the resulting spherical particles at a temperature of at least 1400° C. in an inert atmosphere.

4. The method of claim 3 wherein uranium values are dispersed in said sol at a proportion up to 10 atom percent of the total metal values therein.

5. The method of preparing thorium dicarbide particles which comprises precipitating a haze of solid hydrous thorium oxide particles in an aqueous nitrate system with an aqueous ammonium hydroxide solution, adding finely divided carbon to the resulting mixture at a carbon-to-thorium molar ratio of at least 4 to 1, adding a sufficient amount of an aqueous ammonium hydroxide solution to the resulting carbon-containing mixture to complete the precipitation of hydrous thorium oxide therein, adjusting the nitrate-to-thorium molar ratio of the resulting mixture to .05 to .15, digesting the resulting mixture until a carbon-containing sol is formed, evaporating said sol whereby a dried gel is formed, comminuting the resulting gel and firing the resulting particles at a temperature of at least 1400° C. in an inert atmosphere.

6. The method of claim 5 wherein uranium values are dispersed in said sol at a uranium proportion up to 10 atom percent of the total metal values therein.

7. The method of preparing spherical thorium-uranium dicarbide particles which comprises dispersing finely divided thorium oxide in an aqueous nitrate system at a nitrate-to-thorium molar ratio of about .05 to .15, providing dispersible uranium values in the resulting mixture at a uranium proportion up to 10 atom percent of the total metal therein, adjusting the pH of the resulting mixture to about 3.5 to 4.0, digesting the resulting adjusted mixture at a temperature of 80° C. to 100° C. until a sol is formed, mixing said sol with finely divided carbon at a carbon-to-thorium ratio of at least 4 to 1, evaporating the resulting mixture whereby a dried gel is formed, comminuting the resulting gel and firing the resulting particles at a temperature of at least 1400° C. in an inert atmosphere.

8. The method of claim 7 wherein the diameter of the resulting fired particles is about 100 to 250 microns.

9. The method of claim 7 wherein said finely divided thorium oxide is prepared by contacting thorium nitrate with superheated steam at a maximum temperature of about 475° C.

10. The method of claim 3 wherein said droplets are dispersed and dried by spray-drying.

11. The method of claim 3 wherein said droplets are fed to the center of a heated rotating disc whereby spherical solid particles are formed.

References Cited by the Examiner
UNITED STATES PATENTS 2,928,721   3/60   Mason et al. _____ 23—14.5

OTHER REFERENCES

AEC Document TID–11, 494, April 1960, pp. 4–9.

REUBEN EPSTEIN, *Primary Examiner.*

CARL D. QUARFORTH, *Examiner.*